United States Patent Office 3,796,714
Patented Mar. 12, 1974

3,796,714
LACTONE AND SULTONE ADDUCTS OF BICYCLIC TERTIARY AMINES
Karl Brack, Hyde Park, Wilmington, Del., assignor to Hercules Incorporated, Wilmington, Del.
No Drawing. Filed July 1, 1971, Ser. No. 159,016
Int. Cl. C07d 51/70
U.S. Cl. 260—268 T     9 Claims

ABSTRACT OF THE DISCLOSURE

Adducts of lactones containing 3 carbon atoms in the lactone ring or of sultones containing 2 or 3 carbon atoms in the sultone ring with mono- or diaza-bicyclo[2·2·2] octanes, as, for example, triethylenediamine or quinuclidine, are described. These adducts are useful as aids in the cross-linking of unsaturated polymers present in sealant, adhesive and coating compositions.

---

This invention relates to the adducts of certain lactones and sultones with bicyclic tertiary amines as new compositions of matter.

In accordance with this invention, adducts of lactones that contain three carbon atoms in the lactone ring and of sultones that contain two or three carbon atoms in the sultone ring, with mono- or diaza-bicyclo[2·2·2] octanes have been discovered, which products are useful as latent bases in sealant compositions, as stabilizers for polyvinyl chloride and as acid acceptors in rubber compounding. The new adducts of this invention are the adducts of said lactones and sultones with bicyclic tertiary amines selected from 1-aza-bicyclo[2·2·2]octane, 1-azahydroxybicyclo[2·2·2]octanes and the ethers and esters thereof, 1 - aza - ketobicyclo[2·2·2]octanes, 1,4-diazabicyclo[2·2·2]octane and the mono-, di-, tri- and tetraalkyl substituted derivatives of said mono- and diazabicyclooctanes wherein the alkyl groups are methyl or ethyl and can be alike or different. Thus the adducts have the structure

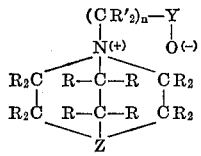

where Z is CR, N or $N^{(+)}$—$(CR'_2)_n$—Y—$O^{(-)}$, Y is CO or $SO_2$, and when Y is CO, $n$ is 2 and when Y is $SO_2$, $n$ is 2 or 3, and each R can be independently selected from the group of H, methyl or ethyl or one R can be hydroxy, alkoxy, aryloxy, or acyloxy and the others H, methyl or ethyl or two Rs attached to the same carbon can be =O and the others H, methyl or ethyl, and when Y is CO each R' is independently selected from H, methyl, ethyl, cyclohexyl or phenyl and when Y is $SO_2$ and $n$ is 2, at least one R' is phenyl and the others are H, methyl, ethyl or phenyl and when $n$ is 3 each R' is independently selected from H, methyl, ethyl, cyclohexyl or phenyl.

The new adducts of this invention are prepared by reacting the lactone or sultone with the mono- or diazabicyclo[2·2·2]octane in an inert diluent under substantially anhydrous conditions. Any beta-lactone, i.e., a lactone containing 3 carbon atoms in the lactone ring, can be used as, for example, propiolactone, beta-butyrolactone, alpha-phenyl-propiolactone, beta-phenyl-propiolactone, alpha,beta-diphenyl-propiolactone, beta,beta-diphenyl-propiolactone, beta-cyclohexyl-propiolactone, etc., and any sultone containing 2 or 3 carbon atoms in the sultone ring, can be used, as, for example, propane sultone, 3-methyl-1,3-propane sultone, 1-phenyl-1,2-ethane sultone, 1,2-diphenyl-1,2-ethane sultone, 1-phenyl - 1,3 - propane sultone, 2-phenyl-1,3-propane sultone, 3-phenyl-1,3-propane sultone, 1-cyclohexyl-1,3-propane sultone, 2-cyclohexyl-1,3-propane sultone, 3-cyclohexyl-1,3-propane sultone, etc. Exemplary of the aza-bicyclo[2·2·2]octanes that can be used are 1-azabicyclo[2·2·2]octane, also known as quinuclidine,
1-aza-3-hydroxybicyclo[2·2·2]octane, also known as 3-quinuclidinol,
1-aza-3-methoxybicyclo[2·2·2]octane,
1-aza-3-ethoxybicyclo[2·2·2]octane,
1-aza-3-phenoxybicyclo[2·2·2]octane,
1-aza-3-acetoxybicyclo[2·2·2]octane,
1-aza-3-benzoyloxybicyclo[2·2·2]octane,
1-aza-3-ketobicyclo[2·2·2]octane, also known as 3-quinuclidinone,
2-methyl-1-azabicyclo[2·2·2]octane,
2-ethyl-1-azabicyclo[2·2·2]octane,
3-methyl-1-azabicyclo[2·2·2]octane,
3-ethyl-1-azabicyclo[2·2·2]octane,
4-methyl-1-azabicyclo[2·2·2]octane,
2,6-dimethyl-1-azabicyclo[2·2·2]octane,
3,5-dimethyl-1-azabicyclo[2·2·2]octane,
2,2,6-trimethyl-1-azabicyclo[2·2·2]octane,
3-ethyl-3-methyl-1-azabicyclo[2·2·2]octane,
1,4-diazabicyclo[2·2·2]octane, also known as triethylenediamine,
2-methyl-1,4-diazabicyclo[2·2·2]octane,
2-ethyl-1,4-diazabicyclo[2·2·2]octane,
2,3-dimethyl-1,4-diazabicyclo[2·2·2]octane,
2,5-dimethyl-1,4-diazabicyclo[2·2·2]octane,
2,6-dimethyl-1,4-diazabicyclo[2·2·2]octane,
2,5,7-trimethyl-1,4-diazabicyclo[2·2·2]octane,
2,2,5,5-tetramethyl-1,4-diazabicyclo[2·2·2]octane, etc.

The reaction can be carried out in any inert diluent, preferably one that is a solvent for the two reactants, and a non-solvent for the adduct that is produced. Exemplary of the diluents that can be used are hydrocarbons including aliphatic, cycloaliphatic and aromatic hydrocarbons such as pentane, hexane, octane, decane, benzene, toluene, xylene, and mixtures of these hydrocarbons as, for example, the petroleum hydrocarbon fractions, alcohols such as methanol, ethanol, etc., ethers such as diethyl ether, tetrahydrofuran, etc., esters such as ethyl acetate, ketones such as acetone, methyl ethyl ketone, methyl isobutyl ketone, etc., and other diluents such as dimethylsulfoxide, acetonitrile and dimethyl formamide. The reaction is generally carried out at room temperature and atmospheric pressure, but a temperature from about —15° C. to about 100° C. can be used.

When a monoaza-bicyclo[2·2·2]octane is used, there will be formed a 1:1 adduct with the lactone or sultone. However, when a diazabicyclo[2·2·2]octane is used either a 1:1 or 1:2 adduct, or a mixture thereof, of the diazabicyclo[2·2·2]octane to lactone or sultone can be produced, depending on the ratio of the reactants. Thus, for the production of a 1:1 adduct of the diaza compound, there will preferably be used less than a mole to mole ratio of the lactone or sultone to the diaza compound to insure production of the 1:1 adduct. Otherwise, there will generally be used an excess of the lactone or sultone.

The lactone and sultone adducts of these aza-bicyclo[2·2·2]octanes are high melting, white solids.

The following examples will illustrate the preparation of the new compounds of this invention. All parts and percentages are by weight unless otherwise indicated.

EXAMPLE 1

A solution of 50 parts of propiolactone in 250 parts of anhydrous toluene was added dropwise over 2 hours at room temperature to a solution of 200 parts of triethylenediamine in 600 parts of anhydrous toluene. The reaction mixture was stirred at room temperature for eight additional hours. Then the solids were isolated by filtration under a nitrogen blanket and washed exhaustively with anhydrous benzene. After drying, the product amounted to 121 parts, had a melting point of 169–172° C., and was soluble in methanol. Analysis for carbon, hydrogen and nitrogen (found: 57.8, 8.8 and 15.0%, respectively; calculated: 58.7, 8.68 and 15.25%) showed that the product was the mono-propiolactone adduct of triethylenediamine.

EXAMPLE 2

A solution of 10.0 parts of triethylenediamine in 500 parts of anhydrous methanol was stirred with external ice cooling under a nitrogen blanket. A solution of 30.0 parts of propiolactone in 200 parts of anhydrous methanol was added dropwise. The reaction mixture was stirred for 16 hours at 0° C. During this time a large amount of white precipitate formed. The solids were isolated by filtration under anhydrous conditions. The solids were washed exhaustively with anhydrous methanol and then dried under vacuum for 20 hours. The product so obtained amounted to 21.1 parts and it had a melting point of 125–131° C. Analysis for carbon, hydrogen and nitrogen (found: 55.7, 7.95, and 11.1%, respectively; calculated: 56.2, 7.81, and 10.94%) showed that the product was the bis(propiolactone) adduct of triethylenediamine.

EXAMPLE 3

A solution of 10.0 parts of 3-quinclidinone in 300 parts of anhydrous tetrahydrofuran was stirred and cooled externally with ice. Under a nitrogen blanket a solution of 12.0 parts of propiolactone in 100 parts of anhydrous tetrahydrofuran was added dropwise. After the addition was completed, the reaction mixture was allowed to warm to room temperature and stirred at room temperature overnight. The product was isolated by filtration under anhydrous conditions, washed exhaustively with anhydrous tetrahydrofuran, and dried under vacuum at room temperature for 16 hours. There was obtained 13.6 parts of the propiolactone adduct of 3-quinuclidinone. Analysis showed it to contain 60.3% carbon, 7.9% hydrogen and 7.0% nitrogen (theory is 60.9, 7.6 and 7.1%, respectively).

EXAMPLE 4

A solution of 25.0 parts of 3-quinuclidinol dissolved in 750 parts of anhydrous tetrahydrofuran was stirred under a nitrogen blanket and cooled externally with ice. Dropwise a solution of 37.5 parts propoilactone in 150 parts of anhydrous tetrahydrofuran was added over 1 hour. The stirring at 0° C. was continued for an additional one hour. Then the reaction mixture was stirred at room temperature for 16 hours. The solids which formed were isolated by filtration under anhydrous conditions and washed exaustively with anhydrous tetrahydrofuran. The solids were dried under vacuum at room temperature for 16 hours. There was obtained 31.3 parts of the propiolactone adduct of 3-quinuclidinol which had a melting point of 182–185° C. Analysis showed it to contain 60.2% carbon, 8.8% hydrogen and 6.9% nitrogen (theory is 60.2, 8.5 and 7.0%, respectively).

EXAMPLE 5

Ten (10) parts of 3-quinuclidinone were dissolved in 300 parts of anhydrous tetrahydrofuran. This solution was cooled externally with ice and stirred under a nitrogen blanket. A solution of 15.0 parts 1,3-propane sultone in 150 parts anhydrous tetrahydrofuran was added dropwise. Then the reaction mixture was stirred at room temperature for 16 hours. The solids which formed were isolated by filtration under anhydrous conditions and washed exhaustively with anhydrous tetrahydrofuran. The solids were dried under vacuum at room temperature for 20 hours. There was obtained 19.5 parts of the 1,3-propanesultone adduct of 3-quinuclidinone. On analysis it was found to contain 47.8% carbon, 7.2% hydrogen, 5.5% nitrogen and 13.5% sulfur (theory is 48.5, 6.9, 5.7 and 13.0%, respectively).

EXAMPLE 6

Ten (10) parts of 3-quinuclidinol were dissolved in 300 parts of anhydrous tetrahydrofuran. The solution was stirred with external ice cooling. Under a nitrogen blanket a solution of 15.0 parts of 1,3-propane sultone in 100 parts of anhydrous tetrahydrofuran was added dropwise. After the adidtion was completed, the reaction mixture was allowed to warm up to room temperature and subsequently stirred at room temperature for 4 hours. Then the solids were isolated by filtration under anhydrous conditions and washed exhaustively with anhydrous tetrahydrofuran. The solids were dried at room temperature under vacuum for 16 hours. A yield of 18.7 parts of the propane sultone adduct of 3-quinuclidinol with a melting point above 300° C. was obtained. Analysis showed it to contain 47.7% carbon, 7.5% hydrogen, 5.3% nitrogen and 13.2% sulfur (theory is 48.1, 7.6, 5.6 and 12.9% respectively).

EXAMPLE 7

Ten (10) parts of triethylenediamine were dissolved in 30 parts of anhydrous benzene. With stirring at room temperature a solution of 1.6 parts of 1,3-propane sultone in 250 parts of anhydrous benzene was added dropwise under a nitrogen blanket over 2 hours. The milky reaction mixture was stirred at room temperature for 12 hours. Then the solids were isolated by filtration under exclusion of moisture and dried under vacuum at room temperature. There was obtained 2.6 parts of a white, crystalline solid which was soluble in methanol and did not melt below 280° C. Elemental analysis showed it to be the mono-propane sultone adduct of triethylenediamine (found: 45.7% carbon, 7.8% hydrogen, 11.9% nitrogen and 13.9% sulfur; calculated: 46.1, 7.68, 12.0 and 13.7%, respectively).

EXAMPLE 8

Ten (10) parts triethylenediamine were dissolved in 100 parts of anhydrous methanol. The solution was stirred at room temperature under a nitrogen blanket and a solution of 30.0 parts of 1,3-propane sultone in 200 parts of anhydrous methanol was added dropwise. The reaction mixture was stirred at room temperature for 16 hours. Then the solids were isolated by filtration under a nitrogen blanket. After drying under vacuum at 60° C., 31.5 parts of solids were obtained, which did not melt or decompose up to 300° C. Analysis showed it to be the bis (propane sultone) adduct of triethylenediamine (found: 45.7% carbon, 7.8% hydrogen, 11.9% nitrogen and 13.9% sulfur; calculated: 46.1, 7.68, 12.0 and 13.7%, respectively).

EXAMPLE 9

A solution of 7.2 parts of quinuclidine in 250 parts of anhydrous tetrahydrofuran was cooled in an ice-salt cooling bath. While stirring vigorously, a solution of 17.0 parts of propiolactone in 40.0 parts of tetrahydrofuran was added dropwise at such a rate as to maintain the temperature of the reaction mixture between −20 and −15° C. After the addition was completed, the reaction mixture was stirred at −20° C. for an additional 2 hours. It was then allowed to warm to room temperature and the solids were separated by filtration under anhydrous conditions. After washing with anhydrous tetrahydrofuran, the product was dried under vacuum at room temperature for 16 hours. There was obtained 9.6 parts of a white solid having a melting point of 138–141° C. The product was identified as 1,3-propiolactone adduct of quinuclidine by its nuclear magnetic resonance spectrum as well as by elemental analysis (found: 65.1% carbon, 9.71% hydrogen and 7.4% nitrogen; calculated; 65.5, 9.28 and 7.65%, respectively).

EXAMPLE 10

Ten (10) parts of quinuclidine were dissolved in 300 parts of anhydrous tetrahydrofuran. This solution was stirred vigorously and externally ice cooled. Under a nitrogen blanket a solution of 12.0 parts of 1,3-propane sultone in 100.0 parts of anhydrous tetrahydrofuran, was added dropwise. After the addition was completed, the reaction mixture was allowed to warm to room temperature and was stirred for 4 hours. The solids were then isolated by filtration under anhydrous conditions, washed exhaustively with dry tetrahydrofuran and then dried under vacuum at 60° C. for 16 hours. There was obtained 19.1 parts of a white solid which did not melt below 280° C. Elemental analysis showed the product to be the 1,3-propane sultone adduct of quinuclidine (found: 52.1% carbon, 7.99% hydrogen, 5.75% nitrogen and 14.1% sulfur; calculated: 51.5, 8.15, 6.0 and 13.75%, respectively).

EXAMPLE 11

With external cooling, 9.0 parts of anhydrous dioxane was aded to a solution of 8.0 parts of anhydrous sulfur trioxide in 375.0 parts of ethylene dichloride. With stirring, a solution of 10.4 parts of styrene in 33.0 parts of ethylene dichloride was added in one portion. The reaction mixture was stirred for 10 minutes at 0° C., and then 25.0 parts of 3-quinuclidinone dissolved in 25.0 parts of ethylene dichloride were added. The reaction mixture was allowed to sit at 0° C. for 2 days and then for 1 day at room temperature. The solids which had formed were isolated by filtration under anhydrous conditions, washed exhaustively with anhydrous ethylene dichloride and then dried under vacuum at room temperature for 24 hours. There was obtained 13.5 parts of a white solid which was shown by elemental analysis to be the 2-phenyl-1,2-ethane sultone adduct of 3-quinuclidinone (found: 59.1% carbon, 5.8% hydrogen, 4.2% nitrogen and 10.2% sulfur; calculated: 58.3, 6.15, 4.54 and 10.4%, respectively).

The lactone and sultone adducts of the bicyclic tertiary amines of this invention are useful as aids in cross-linking sealant, adhesive and coating compositions comprising cross-linkable, ethylenically unsaturated polymer compositions containing a precursor of a polyfunctional nitrile N-oxide or nitrile imine compound, the precursor on being heated in the presence of one of the adducts of this invention being converted to the free nitrile N-oxide or nitrile imine compound which in turn cross-links the ethylenically unsaturated polymer.

The ethylenically unsaturated polymer used in such sealant, adhesive or coating compositions can be any polymer containing ethylenic unsaturation wherein there is at least one hydrogen attached to at least one of the carbon atoms of the ethylenic double bond, as for example, in polybutadienes, styrene-butadiene copolymers, isobutylene-isoprene copolymers, natural rubber, polyester resins such as maleate- and fumarate-containing polyesters, EPDM terpolymers, unsaturated polyurethanes, etc.

Typical precursors of polyfunctional nitrile N-oxides and nitrile imines that can be used in such compositions are the polyfunctional hydrazide halides such as, for instance, isophthaloyl-bis(phenylhydrazide chloride),
terephthaloyl-bis(phenylhydrazide chloride),
isophthaloyl-bis(methylhydrazide chloride),
isophthaloyl-bis(ethylhydrazide fluoride),
terephthaloyl-bis(methylhydrazide chloride),
terephthaloyl-bis(ethylhydrazide bromide),
succinoyl-bis(phenylhydrazide chloride),
adipoyl-bis(methylhydrazide chloride),
p-phenylene dipropionyl-bis(methylhydrazide chloride),
tetramethylene dibenzoyl-bis(butylhydrazide iodide),
N,N'-p-phenylene-bis(benzoyl hydrazide chloride),
N,N'-m-phenylene-bis(benzoyl hydrazide chloride),
glutaryl-bis(phenylhydrazide chloride),
1,4-cyclohexanedicarbonyl-bis(phenylhydrazide chloride),
trimesoyl-tris(phenylhydrazide chloride),
trimesoyl-tris(methylhydrazide chloride),
trimesoyl-tris(ethylhydrazide chloride),
trimellitoyl-tris(phenylhydrazide chloride),
trimellitoyl-tris(methylhydrazide chloride),
pyromellitoyl-tetrakis(butylhydrazide chloride),
benzene pentacarbonyl-pentakis(phenylhydrazide chloride), and the like; the poly(hydroximoyl halides), polyfunctional carbonylhydroximoyl halides, and polyfunctional nitrolic acids such as 2,3-dioxosuccinobis(hydroximoyl chloride),
methylene-bis(glyoxylohydroximoyl chloride),
ethylene-bis(glyoxylohydroximoyl chloride),
tetramethylene-bis(glyoxylohydroximoyl fluoride),
pentamethylene-bis(glyoxylohydroximoly chloride),
1,2,3-propane-tris(glyoxylohydroximoyl chloride),
1,2,4-pentane-tris(glyoxylohydroximoyl chloride),
1,4-cyclohexane-bis(glyoxylohydroximoyl chloride),
p-phenylene-bis(acetohydroximoyl chloride),
2,2'-thia-bis(acetohydroximoyl chloride),
3,3'-thia-bis(propionohydroximoyll chloride),
isophthalo-bis(hydroximoyl chloride),
terephthalo-bis(hydroximoyl chloride),
4,4'-bis(benzohydroximoyl chloride),
4,4'-methylene-bis(benzohydroximoyl chloride),
4,4'-oxo-bis(benzohydroximoyl chloride),
3,3'-thia-bis(benzohydroximoyl chloride),
p-phenylene-bis(glyoxylohydroximoyl chloride),
4,4'-bis(phenylglyoxylohydroximolyl chloride),
4,4'-methylene-bis(phenylglyoxylohydroximoyl chloride), the ethylene glycol, tetramethylene glycol, 1,4-cyclohexylene glycol, resorcinol, etc., esters of chloroximinoglyoxylic acid, etc., 4,4'-methylene-bis(phenylglyoxylonitrolic acid), m-phenylene-bis(glyoxylonitrolic acid), 4,4'-bis(phenylglyoxylonitrolic acid), etc.

Varied amounts of the precursor and lactone or sultone adduct can be used, depending on the degree of cross-linking desired, the nature of the unsaturated polymer, etc. In general, the amount of the nitrile N-oxide or nitrile imine precursor used will be from about 0.1% to about 30% based on the weight of the polymer. The amount of the lactone or sultone adduct used should be an amount sufficient to convert the precursor to the corresponding nitrile N-oxide or nitrile imine and generally will be in excess of that amount.

Any desired means can be used for incorporating the precursor and adduct into the unsaturated polymer. As already stated, cross-linking of these cross-linkable compositions is initiated by heating the composition, the exact temperature required for such initiation depending in large measure on the specific adduct used. Generally it will be a temperature of from about 90° C. to about 180° C. for a period of from about 0.5 minute to about 120 minutes.

The following examples will illustrate the process of cross-linking unsaturated polymers by means of a polyfunctional nitrile N-oxide or nitrile imine precursor in combination with the adducts of this invention.

EXAMPLE 12

Five (5) parts of a branched, ethylenically triunsaturated urethane copolymer having a molecular weight of approximately 5000, 90 parts of a linear, ethylenically diunsaturated urethane copolymer having a molecular weight of approximately 15,000, 3 parts of bis(phenylglyoxylohydroximoyl chloride), and 3 parts of the monopropiolactone adduct of triethylenediamine prepared in Example 1 were mixed on a 3-roll until homogeneous.

The smooth tan paste was storable at room temperature under exclusion of moisture of 2 months without a change in viscosity.

A sample of this paste was heated to 120° C. for ½ hour. During this time it turned into a tough rubber, which was insoluble in tetrahydrofuran.

EXAMPLE 13

Fifty (50) parts of a branched, ethylenically triunsaturated urethane copolymer having a molecular weight of approximately 5000, 6.0 parts of bis(phenylglyoxylohydroximoyl chloride), and 8.0 parts of the bis(propiolactone) adduct of triethylenediamine prepared in Example 2 were milled together until a homogeneous paste was obtained.

This paste was stored at room temperature under exclusion of moisture for 3 months without a change in viscosity.

A sample of this paste was heated to 120° C. for 20 minutes. During this time it cross-linked to a tough rubber, which was insoluble in tetrahydrofuran and methylene chloride.

EXAMPLE 14

Thirty (30) parts of a diallyl isophthalate prepolymer (having a molecular weight of approximately 2000, an iodine number of 26, and a specific gravity of 1.3), 6.3 aprts of finely powdered trimesoyl tris(phenylhydrazide chloride), 10 parts of titanium dioxide as a filler, and 10 parts of a chlorinated wax plasticizer were milled together in a 3-roll mill until homogeneous. Then 7.5 parts of the propiolactone adduct of 3-quinuclidinone prepared in Example 3 were added. The mixture was milled until a homogeneous paste was obtained.

This paste can be stored at room temperature under exclusion of moisture for 2 months without cross-linking.

A sample of the above formulation was heated to 120° C. for 1 hour. During this time it cross-linked to a tough rubber, which was insoluble in tetrahydrofuran.

EXAMPLE 15

On a 3-roll mill, 40 parts of a copolymer of isobutylene and butadiene (having a molecular weight of approximately 8000 and containing 5 mole percent butadiene) is mixed with 3 parts terephthalo-bis(hydroximoyl chloride). Then subsequently 10 parts of titanium dioxide and 10 parts of chlorinated paraffin wax plasticizer are added. Finally, 5.5 parts of the propiolactone adduct of 3-quinuclidinol prepared in Example 4 were added. A smooth paste was obtained which could be stored at room temperature under exclusion of moisture for several months without cross-linking.

A small sample of the above mixture was heated to 120° C. for 30 minutes. During this time it cross-linked to a tough rubber, which was insoluble in tetrahydrofuran as well as methylene chloride.

EXAMPLE 16

One hundred (100) parts of an ethylenically triunsaturated, branched urethane copolymer having a molecular weight of approximately 5000 were mixed with 12.2 parts of 4,4'-oxa-bis(phenylglyoxylohydroximoyl chloride), 15 parts of titanium dioxide as a filler, and 10 parts of chlorinated paraffin wax as a plasticizer and milled in a dough mixer until homogeneous. Then 18 parts of finely ground propane sultone adduct of 3-quinuclidinone prepared in Example 5 were added. The milling was continued until the mixture was homogeneous again. A smooth paste was obtained, which could be stored at room temperature under exclusion of moisture for 3 months without cross-linking.

A sample of the paste was heated to 120° C. for 1 hour. During this time the paste cross-linked to a tough rubber which was insoluble in tetrahydrofuran.

EXAMPLE 17

One hundred (100) parts of a terpolymer of ethylene, propylene, and 1,4-hexadiene (containing 4 weight percent of units derived from propylene, and 58 weight percent of units derived from ethylene and containing about 6.2 double bonds per 1000 carbon atoms) 9.1 parts hexamethylene glycol ester of the oxime of chloroglyoxylic acid, 20 parts of titanium dioxide as filler, and 30 parts of chlorinated paraffin wax as plasticizer were mixed with 1000 parts of anhydrous tetrahydrofuran in a planetary mixer until homogeneous. Then the solvent was removed under reduced pressure. After adding 13.5 parts of the propane sultone adduct of 3-quinuclidinol prepared in Example 6, the mixture was milled on a 3-roll mill until a homogeneous heavy paste was obtained.

This paste was stored at room temperature under exclusion of moisture for 6 months without cross-linking.

A sample of the paste was heated to 120° C. for ½ hour. During this time it cross-linked to a tough rubber which was insoluble in tetrahydrofuran.

EXAMPLE 18

In a planetary mixer, 100 parts of an unsaturated alkyd resin (prepared from hexahydroterephthalic acid, diethylene glycol, dimerized tall oil, fatty acid and maleic anhydride; having a molecular weight of approximately 3100, an acid number of 67, hydroxyl number of 10, and bromine number of 35.2), 26 parts of bis(phenylhydrazide chloride), 30 parts of titanium dioxide as a filler, and 10 parts of chlorinated paraffin wax as a plasticizer were milled until homogeneous. Then 34 parts of the mono-(1,3-propane sultone) adduct of triethylenediamine prepared in Example 7 were added and the milling was continued until the mixture was homogeneous again.

The mixture was storable at room temperature under exclusion of moisture for 3 months without cross-linking.

A sample of the paste was heated to 120° C. for ½ hour. During this time it cross-linked to a tough rubber which was insoluble in tetrahydrofuran.

EXAMPLE 19

One hundred (100) parts of an ethylenically triunsaturated, branched urethane copolymer having a molecular weight of approximately 5000, 12 parts of bis(phenylglyoxylohydroximoyl chloride), 20 parts of titanium dioxide as a filler and 5 parts of a chlorinated paraffin wax as a plasticizer were milled in a dough mixer until a homogeneous paste was obtained. Then 25 parts of the bis(propane sultone) adduct of triethylenediamine prepared in Example 8 were added and the milling was continued until the mixture was homogeneous again. The smooth paste was stored at room temperature under exclusion of moisture for 3 months without cross-linking.

A sample of the paste was heated to 120° C. for ½ hour. During this time it cross-linked to a tough rubber which was insoluble in tetrahydrofuran.

EXAMPLE 20

In a Banbury mixer 60 parts of a copolymer of butadiene and acrydonitrile (having a molecular weight of approximately 6000 and containing 4 mole percent of butadiene) and 11 parts of bis(phenylglyoxylohydroximoyl chloride) were mixed until a homogenous paste was obtained. Then 10 parts of titanium dioxide were milled in as a filler, followed by 12 parts of the propiolactone adduct of quinuclidine prepared in Example 9. A smooth cream was obtained which was storable at room temperature under exclusion of moisture for 3 months without a change in viscosity.

A sample of the above formulation was heated to 120° C. for 3 minutes, then allowed to sit at room temperature for 4 hours. During this time it cross-linked to a tough rubber which was insoluble in tetrahydrofuran.

EXAMPLE 21

In a dough mixer, 100 parts of polybutadiene (having a molecular weight of approximately 2000, an iodine number of 325 and a specific gravity of 0.91), 42 parts of isophthaloyl-bis(phenylhydrazide chloride), 20 parts of titanium dioxide and 3 parts of hydrogenated castor oil as a thixotropic agent were milled until homogeneous. Then 5.5 parts of finely ground 1.3-propane sultone adduct of quinuclidine prepared in Example 10 was added. The mixture was milled until homogeneous.

The cream which was obtained was stored at room temperature under exclusion of moisture for 3 months without cross-linking.

A sample of the above mixture was heated to 120° C. for ½ hour. During this time it cross-linked to a tough rubber which was insoluble in tetrahydrofuran.

EXAMPLE 22

One hundred (100) parts of an ethylenically triunsaturated, branched urethane copolymer having a molecular weight of approximately 5000 were mixed with 12 parts of bis(phenylglyoxylohydroximoyl chloride), 20 parts of titanium dioxide as filler and 10 parts of chlorinated paraffin wax as a plasticizer and the mixture was milled in a dough mixer until homogeneous. Then 25.0 parts of the 2-phenyl-1,2-ethane sultone adduct of 3-quinuclidinone were added. The milling was continued until the mass was homogeneous. A smooth paste was obtained which was storable at room temperature under exclusion of moisture for 3 months without a change in viscosity.

A sample of the paste was heated to 140° C. for 0.5 hour. During this time it turned into a tough rubber, which was insoluble in tetrahydrofuran.

What I claim and desire to protect by Letters Patent is:

1. As a composition of matter the adduct of a bicyclic tertiary amine, having a formula selected from

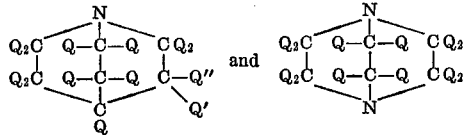

where each Q is independently selected from the group of hydrogen, methyl and ethyl, Q' and Q" together are =O, Q' is hydrogen where Q" is hydroxy, methoxy, ethoxy, phenoxy, acetoxy or benzoyloxy and Q' is independently hydrogen, methyl or ethyl where Q" is hydrogen, methyl or ethyl; with a lactone selected from the group propiolactone, betabutyrolactone, alpha-phenyl-propiolactone, beta-phenyl-propiolactone, alpha, beta-diphenyl-propiolactone, beta,beta-diphenyl-propiolactone, and beta-cyclohexyl-propiolactone, or a sultone selected from the group propane sultone, 3-methyl-1,3-propane sultone, 1-phenyl-1,2-ethane sultone, 1,2-diphenyl-1,2-ethane sultone, 1-phenyl-1,3-propane sultone, 2-phenyl-1,3-propane sultone, 3-phenyl-1,3-propane sultone, 1-cyclohexyl-1,3-propane sultone, 2-cyclohexyl-1,3-propane sultone, and 3-cyclohexyl-1,3-propane sultone; wherein each N on the said bicyclic tertiary amine is reacted with said lactone or said sultone.

2. The bis-propiolactone adduct of 1,4-diazabicyclo[2·2·2]octane.

3. The bis-propane sultone adduct of 1,4-diaza bicyclo[2·2·2]octane.

4. The propiolactone adduct of 1 - azabicyclo[2·2·2]octane.

5. The 1,3-propane sultone adduct of 1-azabicyclo[2·2·2]octane.

6. The propiolactone adduct of 1-aza-3-hydroxybicyclo[2·2·2]octane.

7. The 1,3-propane sultone adduct of 1-aza-3-hydroxy-bicyclo[2·2·2]octane.

8. The propiolactone adduct of 1-aza-bicyclo[2.2.2]octane-3-one.

9. The 1,3-propane sultone adduct of 1-azabicyclo[2·2·2]octane-3-one.

References Cited

UNITED STATES PATENTS

| | | | |
|---|---|---|---|
| 2,977,385 | 3/1961 | Fowler et al. | 260—268 R |
| 3,367,921 | 2/1968 | Sweeney et al. | 260—268 T |
| 3,632,586 | 1/1972 | Brack | 260—268 T |
| 2,833,688 | 5/1958 | Gaertner | 260—327 S |
| 3,531,468 | 9/1970 | Bark | 260—239 BE |

DONALD G. DAUS, Primary Examiner

U.S. Cl. X.R.

260—22 CA, 37 R, 293.53, 32.75 S, 343, 858, 879

PO-1050
(5/69)

UNITED STATES PATENT OFFICE
CERTIFICATE OF CORRECTION

Patent No. 3,796,714      Dated March 12, 1974

Inventor(s) Karl Brack

It is certified that error appears in the above-identified patent and that said Letters Patent are hereby corrected as shown below:

Printed Patent Column 4, line 11; -

"adidtion" should read -- addition --

Printed Patent Column 8, Example 20, line 62; -

"acrydonitrile" should read -- acrylonitrile --

Signed and sealed this 24th day of September 1974.

(SEAL)
Attest:

McCOY M. GIBSON JR.
Attesting Officer

C. MARSHALL DANN
Commissioner of Patents